United States Patent [19]

Clement

[11] 4,326,262

[45] Apr. 20, 1982

[54] UNIVERSAL SIGNAL GENERATOR AND SIGNAL PARAMETER COMPARATOR

[76] Inventor: Alvin H. Clement, 4924 Greenville, Dallas, Tex. 75206

[21] Appl. No.: 951,447

[22] Filed: Oct. 16, 1978

[51] Int. Cl.³ .......................... G06G 7/19; G06G 7/26
[52] U.S. Cl. .................................. 364/851; 364/421; 364/819; 364/862; 367/38
[58] Field of Search ............... 364/862, 851, 860, 852, 364/854, 607, 608, 819–824, 728, 421, 422; 340/15.5 TA, 15.5 DP, 15.5 CP; 360/8, 9, 10, 12, 63; 367/143, 38–42, 189, 190, 63, 81, 86, 137, 138

[56] References Cited

U.S. PATENT DOCUMENTS

| | | | |
|---|---|---|---|
| 2,958,849 | 11/1960 | Begun | 360/8 X |
| 3,060,409 | 10/1962 | Daniels et al. | 364/862 X |
| 3,108,249 | 10/1963 | Clement | 364/819 X |
| 3,164,807 | 1/1965 | Reque | 364/607 X |
| 3,170,031 | 2/1965 | Okamura | 360/9 X |
| 3,275,980 | 9/1966 | Foster | 364/422 X |
| 3,487,681 | 1/1970 | Swift | 364/422 X |
| 3,519,925 | 7/1970 | Anstey et al. | 364/823 |
| 3,564,127 | 2/1971 | Sziklai | 360/9 |
| 3,609,684 | 9/1971 | Lipp | 364/819 X |
| 4,096,385 | 6/1978 | Marett | 364/422 X |
| 4,117,600 | 10/1978 | Guignard et al. | 364/422 X |
| 4,129,821 | 12/1978 | Messner | 364/422 X |

OTHER PUBLICATIONS

Tinch et al.-"Application of Magnetic Tapes to Well Logging"-Journal of Petroleum Technology-Jun. 1966-pp. 687-696.

Swiss-"The "Use of Computers in Oil and Gas Prospecting"-Data Systems, Dec. 1968-pp. 28-30.

Primary Examiner—Joseph F. Ruggiero
Attorney, Agent, or Firm—Neal J. Mosely

[57] ABSTRACT

A novel universal signal generator is disclosed comprising a composite system including a library or bank of signals consisting of pre-recorded signals of desired form which may be selected as the output of the apparatus. The output of the library or bank of signals may be varied in a manner which is permutated, systematic, random, jittered or wobulated, or in accordance with a predetermined mathematical curve. The output of the bank or library of signals, either as is or as modified, may be fed through a suitable correlator and/or a power spectra density comparator. The signal output, as is or as modified, or the output from the correlator or the power spectra density comparator may be modified by a suitable secondary modulator or second signal generator. A recording mechanism is provided for amplifying and recording a signal from within the system on separator recording tracks in both a forward and reverse direction. A recording means is provided for recording the signal from the recorded tracks and the auto-correlation, cross-correlation, and/or retrocorrelation functions or these recorded signals. The record of these correlations may be of a member, set, or ensemble of the signal components. The output signal from the apparatus may be drawn from any of the aforementioned components with the result that the apparatus is capable of producing a signal which is systematic or random in virtually any desired manner, or signals which may be of virtually any combination of systematic and random forms.

24 Claims, 1 Drawing Figure

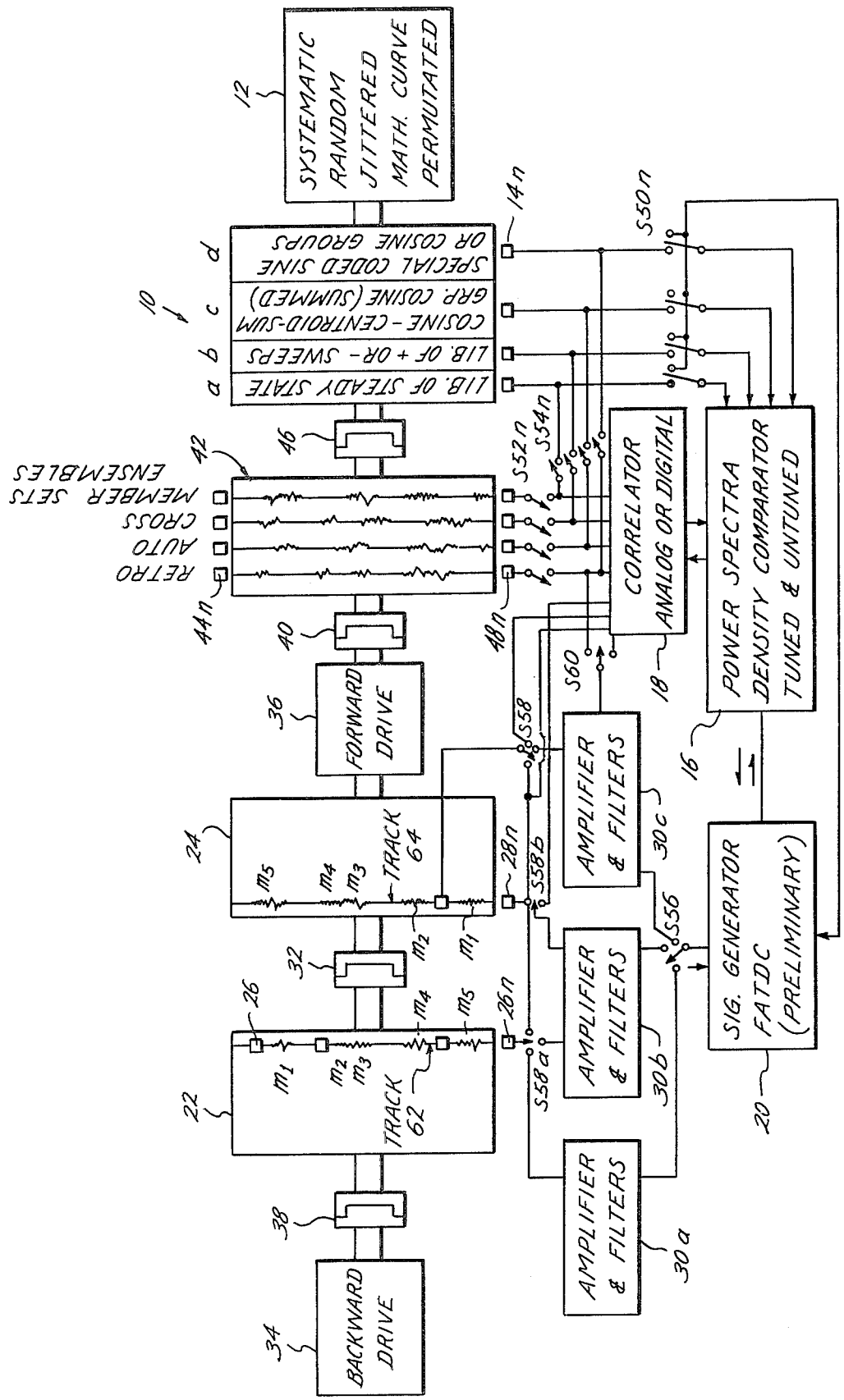

UNIVERSAL SIGNAL GENERATOR AND SIGNAL PARAMETER COMPARATOR

BACKGROUND OF THE INVENTION

1. Field of the Invention

This invention relates to signal generation for seismic systems, radar systems, sonar systems, secret communication systems, etc. More particularly, the invention is concerned with signal generation with continual change or correction in the signal in response to the signal environment.

2. Brief Description of the Prior Art

In communications systems utilizing correlation techniques in seismic applications, there are many forms and heretofore little or no efforts have been given to the problem of forcing the transmitter to transmit information at the highest possible rate or to automatically design, or self-design on line in the field, an optimized or code or families of codes to evade the particular type of surface noise encountered or to optimize the return from a particular group of reflecting interfaces relative to another group of reflecting interfaces. There has been little or no effort to force to the practical limits the maximum use of the available band width of the earth and the band width of the excitation system, optimally managed or balanced with the optimized use of the band width of the receiving and recording equipment.

There has also been little or no effort made to optimally manage the equipment and the excitation program for the overall maximum return of information while on line in the field. All efforts have usually been made to obtain a redundant amount of data in the obvious prominent center of the band pass of the returning signals. Practically all the redundant efforts and techniques degrade the available band width but improve the signal to noise ratios. A final whitewash pass has been used by means of spiking filters and deconvolution operators to cover up the field problems and to improve the apparent band width. Few efforts have been made to manage the troublesome low end and high end of the seismic spectrum.

The various equipment and the operators, by tradition and habits, work near the center of the available band pass of the equipment and the earth; using CPU's long after the field crew has left the location to clean up and whitewash the narrow band width noisy data with various computer oriented techniques. The problems are quite complex with the result that input efforts have been directed to solution of the gross problem with the gross management of the spectrum leaving much to be desired. The final result has been a narrow band width limited wavelet with unstable characteristics because of random variations of the transmission channel under gross systematic input programs.

The response of the earth to broad band signals is passive and random. Measuring equipment should be capable of adapting with variable efforts and variable strategies. Variable strategies would be in the form of self design on line evasive codes and variable input efforts for each slice of the usable seismic spectrum. This spectrum is generally 4 HZ to 1,000 HZ and is extremely variable.

Signal generators which have been available heretofore for seismic exploration systems, communications systems, radar, etc. have been incapable of production of signals in a systematic form or in a random manner. Prior art signal generators have not been variable and adaptable with fast feedback loop specifically designed on-line for encountered problems to produce a large variety of signals. In particular, prior art signal generators have not been available which would produce random signals and also systematic signals which may be varied on-line as needed in accordance with the environment in which the equipment operates.

In seismic exploration applications, there has been a need for measuring or exploration equipment which is capable of self management to cope with the encountered situations. There has been a need for equipment which could null over or self seek the white wavelet, or correlation function with optimized band width, with minimum side lobes for all travel time paths in variable environment. The white wavelet with maximum band width and minimum side lobes, divorced from the effects of its neighbors, stabilized for the effects of the transmission paths represents the maximum amount of information that can be obtained. Obtaining this white wavelet in a randomly or systematically varying environment is a principal purpose of this invention.

SUMMARY OF THE INVENTION

This invention relates to new and useful improvements in signal generators and more particularly to a universal signal generator. The invention involves a universal signal generator in which a variety of systematic and/or random signals may be generated and may be varied in form in relation to the environment in which the signal operates. A library or bank of recorded signals or varying form, including random signals and systematic signals of all kinds, is provided as the source of selected signals to be originated by this signal generator. The selected signal from the bank or library of signals may be subjected to correlation, including autocorrelation, cross-correlation, and retro-correlation, and may be evaluated in a power spectra density comparator. The signal, as generated, or as modified by the correlator or the power spectra density comparator, may be fed to a suitable secondary signal generator or signal modulator for secondary encoding. The signal, either before or after modification or encoding, may be amplified and recorded in forward and reverse form on a suitable recording and playback mechanism. The forward and reverse records may then be subjected to correlation or evaluation on the power spectra density comparator and recorded on a suitable recording device as separate record tracks. The apparatus is capable of producing the signal as originally selected from the bank or library of recorded signals or as modified at any point in the various modification and recording steps or functions. The modified signal may be obtained in a response to information received in the use of the signal for purposes of seismic exploration or may be modified at will according to the operator of the signal generator equipment.

BRIEF DESCRIPTION OF THE DRAWING

The drawing comprises a schematic diagram of a universal signal generator constructed in accordance with this invention.

SETTING OF THE INVENTION

This invention relates to a novel signal generator but, in order to understand completely the construction and operation and utility of this generator, a more detailed analysis of the setting of the invention is required.

This invention relates to signal generation and on-line optimized adaptive signal design for the encountered field situation for the excitation input to vibratory transmittors for modified transfer function ratio measurements, travel time measurements for noisy band width limited channels, or the problems encountered in the reflection-refraction seismic exploration fields, and to self management of associated receivers and correlation equipment and input techniques. This all needs to be done in line in the field with continual updating and corrections of all parameters encountered in a randomly or systematically varying environment. This applies both to correlators of the "shift, multiply, integrate" type, as illustrated in Bennett et al. U.S. Pat. No. 2,676,206, Guanella U.S. Pat. No. 2,253,975, and Crawford et al. U.S. Pat. No. 2,989,726, and to the "sine-shift to cosine then sum" systems or the so-called steady state forms of seismic surveying as illustrated by Stanton U.S. Pat. No. 1,790,080, Smith et al. U.S. Pat. No. 3,221,297, McCollum U.S. Pat. No. 3,182,743 and Sparks U.S. Pat. No. 2,235,089.

In communications systems utilizing correlation techniques in seismic applications, there are many forms and heretofore little or no effort has been given to the problem of forcing the transmitter to transmit information at the highest possible rate. Little effort has been given to transmitters which will automatically design, or self design on line in the field, an optimized code or families of codes to evade the particular type of surface noise encountered or to optimize the return from a particular group of reflecting interfaces, relative to another group of reflecting interfaces, or to force to the practical limits the maximum use of the available band width of the earth and the band width of the excitation system, optimally managed or balanced with the optimized use of the band width of the receiving and recording equipment. There has also been little or no effort made to optimally manage the equipment and the excitation program for the overall maximum return of information while on line in the field.

Most efforts have been made to obtain a redundant amount of data in the obvious prominent center of the band pass of the returning signal. Practically all of the redundant efforts and technique downgrade the available band width but improve the signal to noise ratios, with a final whitewash path being done by use of spiking filters and deconvolution operators to cover up the field problems and to improve the apparent band width. Few efforts have been made to manage the troublesome low end and high end of the seismic spectrum. The various equipment and the operators work near the center of the available band pass of the equipment and the earth using CPU's long after the field crew has left the location to clean up and whitewash the narrow band width noisy data with various computer-oriented techniques.

The response of the earth to broad band signals is passive and random. Measuring equipment should be capable of adapting with variable efforts and variable strategies. The variable strategies should be in the form of self design on line evasive codes and variable input efforts for each special slice of the usable seismic spectrum. This spectrum is generally 4 HZ to 1,000 HZ and is extremely variable. Measuring or exploration equipment should be capable of self management to cope with the encountered situations. It should be designed to null over or self seek the white wavelet or correlation function with optimized band width, with minimum side lobes for all travel time paths. The white wavelet with maximum band width and minimum side lobes, divorced from the effects of its neighbors, stabilized for the effects of transmission paths represents the maximum amount of information that can be obtained.

Because of the complex problems, the equipment and techniques must be multivariate controlled and auto-adaptive in minimum time. Transmitters must be made intelligent; receivers must be made intelligent; detector arrays must be made intelligent; feedback loops must be fast and develop intelligence. Intelligent selection of the transmitter or receiver array or a particular receiver element must be made. This can only be obtained with machines that are essentially selfgoverning and that are capable of acting on current experience, past experience and anticipated future experience. These machines must exhibit some form of primitive intelligence or function as self organizing systems or trainable nets. Gerhard U.S. Pat. No. 3,435,422 contains an elaborate description of the properties of self organizing systems. Also, see *Self Organizing Systems,* Volumes 1 and 2, Pergamon Press, New York, N.Y. Clement U.S. Pat. No. 3,108,249 also discloses a self organizing system. It generates on line a particular set of codes, makes comparisons of various signal parameters and optimizes the code selection for the particular problem encountered. It is a seismic communications surveying system with auto-adaptive capabilities for optimally measuring the various parameters of the earth under excitation by the transmitter programmed by the input code programmer, the Frequency, Amplitude, Time Discrimination Coder or FATDC generator.

The FATDC generator, the input code programmer and other elements in the seismic communications system described in Clement U.S. Pat. No. 3,108,249 are dependent for optimized results on line in the field on the computation, storing, manipulating, comparing, both power spectral densities and phase, both input signals, returning reflections and refractions, noise under excitation by the transmitter, ambient noise of the earth and measuring system without excitation. It is also desirable that the auto-correlation, the cross-correlation, the retro-correlation or auto-convolutional integral be available for various comparisons in the operation of systems as described in the Gerhard and Clement patents. These are also necessary and desirable for optimized versions of many earlier pulse compression techniques in auto-adaptive operation.

The universal signal generator which is shown in the drawing schematically and which is described below, is designed to operate in seismic and other communications systems to provide for the adaptability and variability of the signal generation described above. This signal generator is particularly useful as an improvement for use in the system described in Clement U.S. Pat. No. 3,108,249. In such an application, its purpose is to obtain from the equipment and the communications channel the maximum amount of information in the minimum amount of time. The signal generator, however, can be used with other seismic systems and with other communications systems in which a desired signal can be produced and modified under manual control or as part of an auto-adaptive system. In the management of auto-adaptive machine selected parameters and self designed codes, it is necessary that many on-line comparisons between two or more signal sets be measured in a variable band width with variable signal to noise ratios. Code sequences often must be repeated many times in identical form, often be made slightly different, often to be completely orthogonal relative to each other, often to be in a completely different band pass of the spectrum, often to occupy the same spectral positions in the band pass, but practically uncorrelatable relative to another member, set or ensemble of codes or signals. The signal generator shown in the drawing and described below provides novel means for synthesizing codes, comparing original input excitation signals, comparing parameters of input and returning signals, via auto-, cross-, and retro-correlation functions; comparing power spectral densities of the aforementioned with any desired member, set or ensemble of excitation or returning signals. This signal generator is relatively simple and operable by relatively unskilled personnel.

DESCRIPTION OF THE PREFERRED EMBODIMENT

In the drawing there is shown a schematic or diagrammatic view of a universal signal generator in accordance with this invention. Apparatus consists of recording drum 10 which provides a bank or library of basic signals for use on a selective basis. Recording drum 10 is preferably a conventional magnetic recording and playback drum having a plurality of individual record tracks for generation of a selected desired signal. While the apparatus shown is a conventional recording drum, it should be understood that any equivalent recording device, including tape, disc, photoelectric record, etc., may be used. Recording drum 10 is shown as having subsection a which is a library of steady state signals, subsection b which is a library of plus or minus sweeps, subsection c which is a record of cosine-centroid-sum group cosine (summed or unsummed), and subsection d, special coded sine or cosine groups. These record tracks are illustrative of the type of signal which may be recorded on recording drum 10 for selective use. Each of the aforementioned subsections may have a large number of separate signal tracks which may be individually selected for use and additional categories of signal tracks may be used on the recording drum 10 as desired. Recording drum 10 is driven by motor 12 (or other suitable driving means) which may be used to drive drum 10 in a systematic manner or may be varied randomly, or may be jittered or wobulated, or may be varied in function according to any predetermined mathematical curve, or may be permutated in operation. These variations in operation of motor 12 may be accomplished by variation in the operation of the motor itself or in any suitable control of the output from the motor to the drum 10. This variation in operation of drum 10 makes it possible to vary the output of any of the signal tracks from drum 10 in any desired manner. Recording drum 10 is provided with a plurality of recording and playback heads 14n (subscript n indicates that there may be any number of these heads, any number of tracks on the recording drum, and the heads may be placed in any arrangement on the periphery of the drum, either systematically or randomly arranged).

Playback heads 14n are connected, as indicated, to power spectra density comparator 16 which may be of any number of channels and may be tuned or untuned. Power spectra density comparator 16 (which may be abbreviated PSDC) is a type of equipment well known in the art and a simple form of PSDC unit is illustrated in FIG. 14 of Clement U.S. Pat. No. 3,108,249. While PSDC unit 16 is shown connected to the output from playback heads 14n, it may be connected to any point on the overall signal loop, as shown in U.S. Pat. No. 3,108,249. PSDC unit 16 may be any number of channels. The filters may be built of any well known type of filter banks; electrical, mechanical or digital computers may be programmed to perform the operation. The total band width may be subdivided into any number of sharply tuned bands with any degree of overlap.

The apparatus is provided with correlator 18 which is arranged for connection to perform the desired correlation with respect to the signal output from any of a variety of the components of the apparatus. Correlator 18 may be a conventional analog correlator or may be a digital computer programmed to function as a correlator. Correlator 18 may be of the analog or digital type and may be of any number of channels on both the reference trace and the signal traces. It may also perform the desired correlation on a sine-shift to cosine then sum signal. The correlator is capable of carrying out auto-correlation, cross-correlation, and retro-correlation.

The apparatus includes signal generator 20 which is a frequency, amplitude, time discrimination coder (also called a FATDC unit) of the type shown and described in U.S. Pat. No. 3,108,249. Signal generator 20 selects and modifies the signal output from the selected channel or track on recording drum 10, or from other portions of the equipment as will be hereinafter described.

This apparatus is provided with additional recording and playback functions in the form of recording drums 22 and 24. Recording drums 22 and 24 are preferably multi-channel or multi-track magnetic recording drums. Other suitable multiple recorders including tape recorders, disc recorders, photoelectric recorders or the like may be used. Recording drums 22 and 24 are provided with magnetic recording and playback heads 26n and 28n, respectively. The subscript "n" indicates that there may be any number of these heads, corresponding to any number of tracks on drums 22 and 24, and the heads may be placed in any arrangement on the periphery of the drums, either systematically or randomly arranged. A plurality of record pickup amplifier-filters 30a, 30b, and 30c are provided in connected with recording and playback heads 26n and 28n.

Recording and playback drums 22 and 24 are arranged for rotation together but may be disconnected by means of clutch 32. Drive units 34 and 36 are provided for driving drums 22 and 24 either together or separately. Drive unit 36 may drive drum 24 (and drum 22, if desired) in a forward direction. Drive unit 34 may drive drum 22 (and drum 24, if desired) in a backward direction. Backward drive unit 34 may be disconnected from drum 22 by clutch 38.

Forward drive unit 36 is connected through releasable clutch 40 to recording drum 42 which functions as the readout for correlator 18, and also may record the output from recording drums 22 and 24 or from other parts of the system if desired. Drum 42 has magnetic heads 44n for each of the several recording tracks which include the retro-correlation signal, auto-correlation signal, cross-correlation signal and the track of the signal for a particular member, set, or ensemble. The terms member, set and ensemble are used herein in a statistical sense. By analogy to the letters of the alphabet, a single letter is a member, a group of letters which is ordered as a word or code unit is a set, and the alphabet as a whole is an ensemble. This definition applies to coded signals where a member is the smallest unit, a set is a preselected group of members and the ensemble is the totality of the group of members, although the members may be arranged in a variety of manner within an ensemble. Tape drum 42 is connected to and disconnectable from tape drum 10 by clutch 46. Tape drum 42 is provided with a plurality of magnetic heads 48n which are connected to the input or output of correlator 18 as indicated, or can be connected to any output from the drum 10 or 22, 24 or amplifiers 30.

The connection between the various components of the system is clearly indicated from the schematic wiring diagram and has been described completely above. There are also provided a plurality of switches or banks of switches for interconnecting or disconnecting various of the components. A bank of switches S50n is provided in the connections between magnetic heads 14 and PSDC unit 16 to provide for connection of the output from heads 14n to PSDC unit 16 or to signal generator 20. Switches S52n connect or disconnect magnetic heads 48n from correlator 18. Switches S54n connect or disconnect correlator 18 or magnetic heads 14n.

Signal generator 20 is provided with switch S56 which selectively connects to amplifier-filters 30a, 30b or 30c. Switches S58, S58a, and S58b are selector switches for connecting or disconnecting amplifier-filter units 30a, 30b, 30c to or from magnetic heads 26n and 28n. Switch S60 is arranged to connect or disconnect amplifier-filter 30c to correlator 18 or recording drum 42.

OPERATION

In operation, magnetic recording drum 10 is rotated by drive 12 in any preselected manner. Drum 10 may be rotated uniformly in a systematic manner or may be varied randomly or jittered or wobulated or varied along a pre-selected mathematical curve or permutated in operation. This will vary the output signal from the selected signal track in any of a variety of ways. In fact, the apparatus is capable of an almost infinite variety of selected signal outputs. The selected signal from a particular track from magnetic head 14n is connected to PSDC unit 16, or if desired, may be bypassed by switch S50n directly to signal generator (FATDC unit) 20. Switch S50n also provides for the selection of the particular track on recording drum 10 from which the signal is drawn. The output from signal generator 20 may be connected by selector switch S56 through amplifier-filter units 30 to be recorded on drums 22 and 24. In this part of the operation clutch 32 is disconnected and drums 22 and 24 are rotated separately by backward drive 34 and forward drive 36, respectively. This results in recording data on track 62 on drum 22 and track 64 on drum 24. Track 62 consisting of signal sequences designated $m_1$, $m_2$, $m_3$, $m_4$ and $m_5$ and is a reverse copy of track 64 consisting of signal sequences $m_5$, $m_4$, $m_3$, $m_2$ and $m_1$. Both signals may be routed through correlator 18 th rough switches S58, S58a and S58b. Correlation may be done on the total ensemble between the two signals or correlation may be done on only selected portions of the signal sequence, as desired. The signals may be selectively amplified and edited prior to correlation. Retro-correlation or auto-convolution is done by correlating the reverse copy with the forward copy. Auto-correlation is done by correlating a copy of a trace with itself. Cross-correlation is done by correlating a selected reference trace against another unlike trace, checking for points of correlation, see Bennett et al. U.S. Pat. No. 2,676,206.

Each member, set and ensemble forming a part of the selected signal, may be recorded on drum 42. The auto-correlation of each member, set, and ensemble is computed by the correlator 18 and recorded on drum 42. The cross-correlation of any selected portions of a trace may be computed and recorded on recording drum 42. The cross-correlation of the total trace or of any number of traces is computed and recorded and may be summed, if desired. The retro-correlation may be computed and recorded for each member, set and ensemble in the signal.

All of this data is recorded on appropriate track on drum 42. All data is plotted in known position relative to the original members, sets and ensembles. Recording playback heads 44n can be staggered or positioned in parallel. Any number of heads may be positioned around the periphery of the track with any selected, systematic or random offset between the heads. Only one head is normally actively connected at one time. The redundant heads and switches are not shown.

As a result of the described operation, the following information is recorded on the same tape system or drum 42:

1. Original member track: the member, frequency, phase, amplitude.
2. Original set track: the set, frequency, phase, amplitude, time discrimination or interval.
3. Original ensemble track: the ensemble, frequency, phase, amplitude, time discrimination of interval modulated or $\Delta T$ discrimination.
4. Auto-correlation track: auto-correlation of members, sets, ensembles.
5. Cross-correlation track: cross-correlation of members, sets, ensembles or of any desired combination.
6. Retro-correlation track: retro-correlation of members, sets, ensembles, auto-retro-correlation and cross-retro-correlation of members, sets and ensembles.

PSDC unit 16 may be connected to provide the power spectra density of any of the aforementioned signal records or correlation records. These can be compared in any arrangement with any relative amplification or weighting factor. These comparisons are made comparing the respective power spectra, either through ratios of power between the two (as in the PSDC unit illustrated in U.S. Pat. No. 3,108,249) or by a simple subtraction of the power at a line frequency or group of frequencies from another line frequency or group of line frequencies (using the difference in output of watt-hour meters or their physical equivalents).

In the operation of this equipment, PSDC unit 16 may be connected to any of the various signal tracks or to the output of the signal generator to compute the power spectra density of original signal members, sets, or ensembles or of a large number of original signal ensembles. By connection of the various signal tracks to correlator 18 the equipment will compute retro-correlation functions of the original signal set, member or ensemble or of the auto-correlation track or trace sequence or the cross-correlation track or trace sequence. Magnetic recording drum 42 provides for storing and optimum accessibility in comparison of original signal members, sets, and ensembles and for computing and storing the auto-correlation, cross-correlation and retro-correlation of original signal members, sets and ensembles.

The apparatus, by operation of the various switches to reroute and modify the signals, is capable of systematic generation of steady state sine signals of any frequency and duration. It is capable of producing up or down chirps or sweeps, either linear and non-linear. It will produce finite cosine signals of any frequency and duration and grouped cosine signals (where several cosines have been summed). It will also provide for time discrimination coding or interval modulation or $\Delta T$ coding of any of the aforementioned signals. The signal generator apparatus is a systematic and random function generator whose frequency output can be multiplied by a discrete systematic number or the entire output can be altered by changing the speed of the drum. The output can be randomly varied by randomly changing the speed of the drum 10. The output can be wobulated or jittered in a random or systematic manner by jittering or wobulating the operation of drive mechanism 12. The output of the signal can be permutated according to any sequence, random or systematic, by appropriate change in the operation of drive unit 12 and by switching between and among the various playback heads. The signal output can vary according to any mathematically derived formula that the drum drive 12 is capable of following.

This signal generator apparatus may produce a suitable signal output which may be selected for maximum or minimum correlatability or maximum delta correlatability or minimum delta correlatability of any selected signal member, set, or ensemble relative to another.

The apparatus, as shown, may use manually operated switches for tailoring the signal to the output desired for the particular environment of the signal, or the switching sequences may be automatic or may function in a self organized manner, as in Clement U.S. Pat. No. 3,108,249 and Gerhardt et al. U.S. Pat. No. 3,435,422. Also, an amplitude spectral density comparator may be used instead of the PSDC unit. Many variations of this invention will be readily apparent to those skilled in seismic art and other fields where radar and sonar techniques are employed. The apparatus shown and the description given above is merely to illustrate the nature of the invention. It is also to be understood that most of the equipment can be reduced to firmware and software for digital computer equivalents. Also, various combinations of parts of this invention combined with portions of the processes that are done by digital computer will be obvious to one of ordinary skill in the art.

I claim:

1. A universal signal generator apparatus comprising recording and playback means associated together in a single apparatus including a plurality of record tracks and a plurality of recording and playback heads associated with respective ones of said record tracks,
   circuit means operatively connected to each of said heads for recording a signal on or playing back a signal from the record track associated therewith,
   switch means in each of said circuit means operable to select a predetermined one of said heads for recording on or playing back a recorded signal from the record track associated therewith for emitting a signal for transmission through the earth, and
   means to vary the signal played back through said predetermined head, while said signal is being played back, from the recorded signal in a preselected manner.

2. A universal signal generator according to claim 1 in which said last named means effects a random variation in the selected signal being played back.

3. A universal signal generator according to claim 1 in which said last named means effects a variation in a preselected ordered manner in the selected signal being played back.

4. A universal signal generator according to claim 1 in which said last named means effects a variation in a signal member.

5. A universal signal generator according to claim 1 in which said last named means effects a variation in a signal set.

6. A universal signal generator according to claim 1 in which said last named means effects a variation in a signal ensemble.

7. A universal signal generator according to claim 1 which includes rotary means on which said record tracks are supported and said signal varying means comprises means to vary the movement of said rotary means in a preselected manner.

8. A universal signal generator according to claim 1 which includes a power spectra density comparator operatively connected to said circuit means for each of said heads and operable to receive and act upon the signal selected by said switch means.

9. A universal signal generator according to claim 1 which includes a correlator operatively connected to the circuit means for each of said heads to effect at least one correlation of the group consisting of auto-correlation, cross-correlation, and retro-correlation on the selected signal being played back.

10. A universal signal generator according to claim 9 which includes a power spectra density comparator operatively connected to said circuit means for each of said heads and to said correlator.

11. A universal signal generator according to claim 9 which includes recording means for recording the signal output from said correlator and the signal input to the correlator.

12. A universal signal generator according to claim 11 in which said signal varying means includes means to vary the recording and playback of the signal recorded by said last name recording means.

13. A universal signal generator according to claim 1 or claim 8 or claim 9 which includes a frequency, amplitude, time discrimination coder operatively connected to said circuit means to act on said selected signal.

14. A universal signal generator according to claim 1 which includes separate means for recording in normal and in reverse form said selected signal for effecting a retro-correlation of said signal.

15. A universal signal generator according to claim 14 in which said separate recording means comprises a pair of magnetic recording drums, separately rotatable, and means to rotate one drum in one direction and the other drum in the opposite direction.

16. A universal signal generator according to claim 14 which includes a correlator operatively connected to said separate recording means to effect a retro-correlation of said selected signal.

17. A universal signal generator according to claim 1 which includes a power spectra density comparator, a correlator, a frequency, amplitude, time discrimination coder, and circuit means interconnecting said comparator, said correlator, and said coder, with said first named circuit means, recording means for recording the signal output from and the signal input to said correlator, and separate means for recording in direct and in reverse form a selected signal for effecting a retro-correlation of said signal.

18. A universal signal generator according to claim 17 including switch means in said interconnecting circuit means to direct a selected signal to any selected component thereof.

19. A method of generating a signal for transmission through the earth having selected, desired characteristics, which comprises providing a library of pre-recorded signals for playback, selecting and playing back one of said signals, varying said selected signal during playback in a selected manner, and transmitting said varied signal into the earth.

20. A method according to claim 19 in which said selected signal is varied in a random manner.

21. A method according to claim 19 in which said selected signal is varied in a pre-selected ordered manner.

22. A method according to claim 19 in which a signal member is varied.

23. A method according to claim 19 in which a signal set is varied.

24. A method according to claim 19 in which a signal ensemble is varied.

* * * * *